May 5, 1931.  C. L. BROWN  1,804,311
AIRCRAFT MOTOR AND MOUNTING
Filed Aug. 9, 1929   3 Sheets-Sheet 1

INVENTOR.
Charley L. Brown
BY *Lamaster and Allwine*
ATTORNEYS.

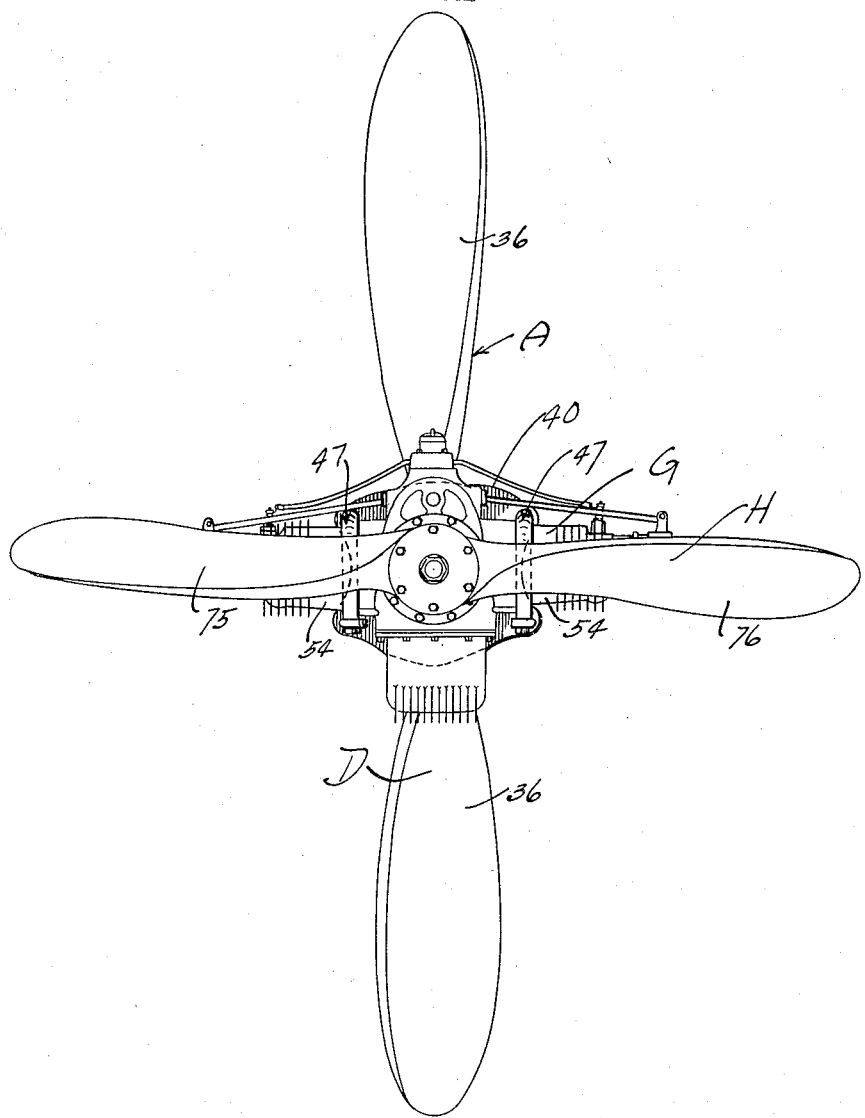

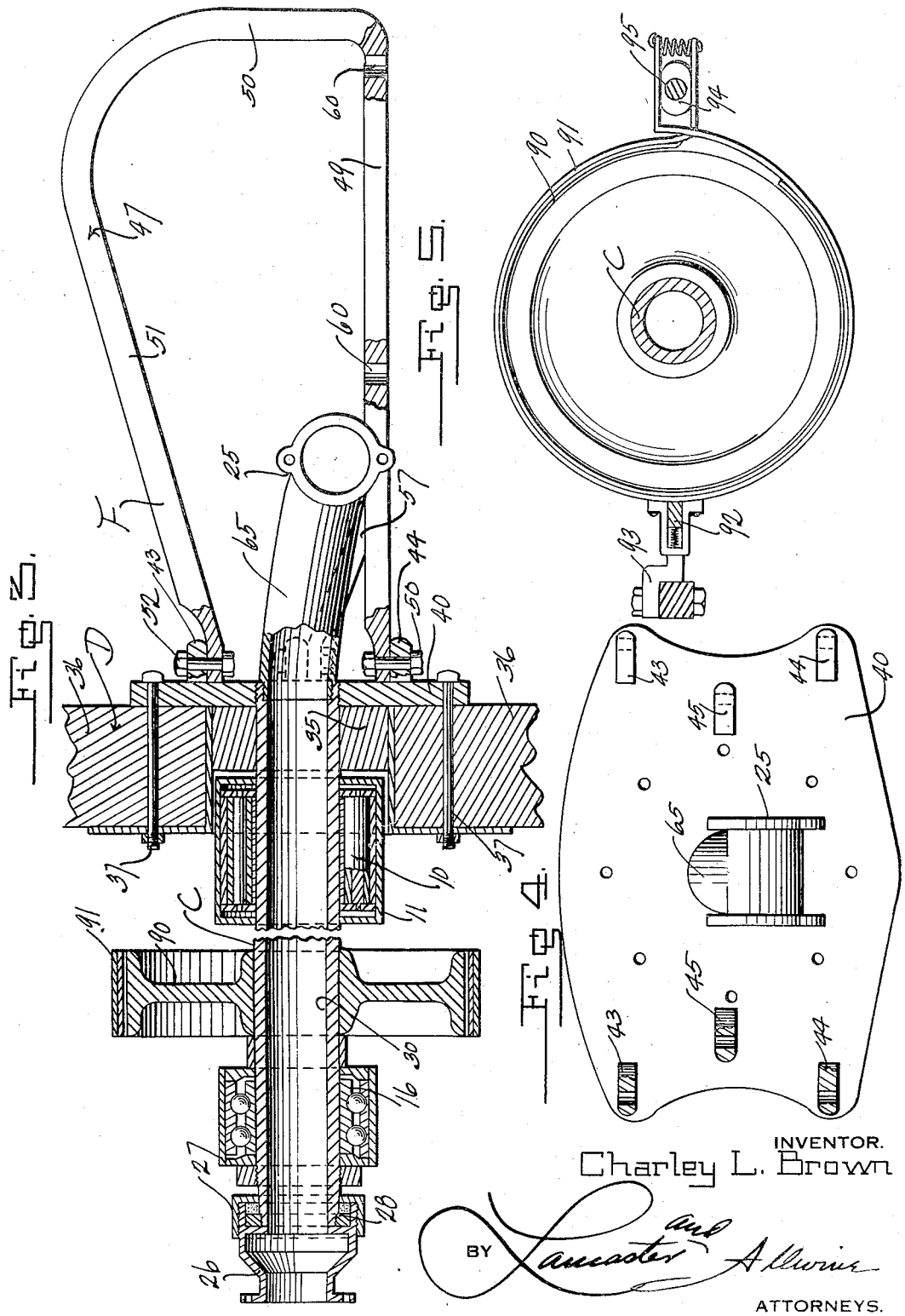

Patented May 5, 1931

1,804,311

UNITED STATES PATENT OFFICE

CHARLEY L. BROWN, OF RUSHVILLE, MISSOURI

AIRCRAFT MOTOR AND MOUNTING

Application filed August 9, 1929. Serial No. 384,778.

This invention relates to improvements in power plant equipment for aircraft.

The primary object of this invention is the provision of an internal combustion engine for aircraft, which includes means to compensate for the torque, incident to propeller rotation, in overbalancing the aircraft at slower speeds, whereby the aircraft may be maintained upon an even keel during flight, substantially the same as in gliding, preferably without any compensating guidance through control surfaces of the aircraft.

It is well understood by those skilled in this art that the torque incident to motor operation has a tendency to turn the aircraft about its longitudinal axis during flight. This is readily compensated, in conventional practice, by shaping the control surfaces. However, it is an important object of this invention to control such torque, and at the same time provide a high speed engine, by rotatably mounting the motor upon the frame of the aircraft, so that the back pressure caused by explosions in the motor for operating the main propeller, will, incident to the back pressure, rotate the motor counter to main propeller rotation; an auxiliary propeller having a greater and an opposite pitch to the main propeller, being secured for rotation with the motor.

A further object of this invention is the provision of aircraft power plant equipment including a motor rotatably supported upon the frame of the aircraft so that it may rotate counter to rotation of the main propeller, as the result of back pressure in the motor during its functioning, the motor having an auxiliary propeller rotatable therewith reversely to the direction of rotation of the main propeller, with a pitch opposed to the main propeller; novel means being provided for neutralizing the propelling effect incident to rotation of the motor, so that the main propeller may have an increased efficiency.

Other objects and advantages of this invention will be apparent during the course of the following detailed description.

In the accompanying drawings, wherein similar reference characters designate corresponding parts throughout the several views, Figure 1 is a fragmentary plan view of the improved motor unit, showing its relation to an aircraft frame and the associated details thereof.

Figure 2 is a front elevation of the power plant, showing the relation of the details of the motor, and more particularly the mounting thereof and the relation of main and auxiliary propellers.

Figure 3 is a fragmentary view, partly in section, showing cooperating details for the motor support.

Figure 4 is a sectional view showing more particularly the frame mounting of the motor upon the hub of the auxiliary propeller.

Figure 5 is a sectional view taken through brake mechanism of the invention substantially on the line 5—5 of Figure 1.

Figure 1:
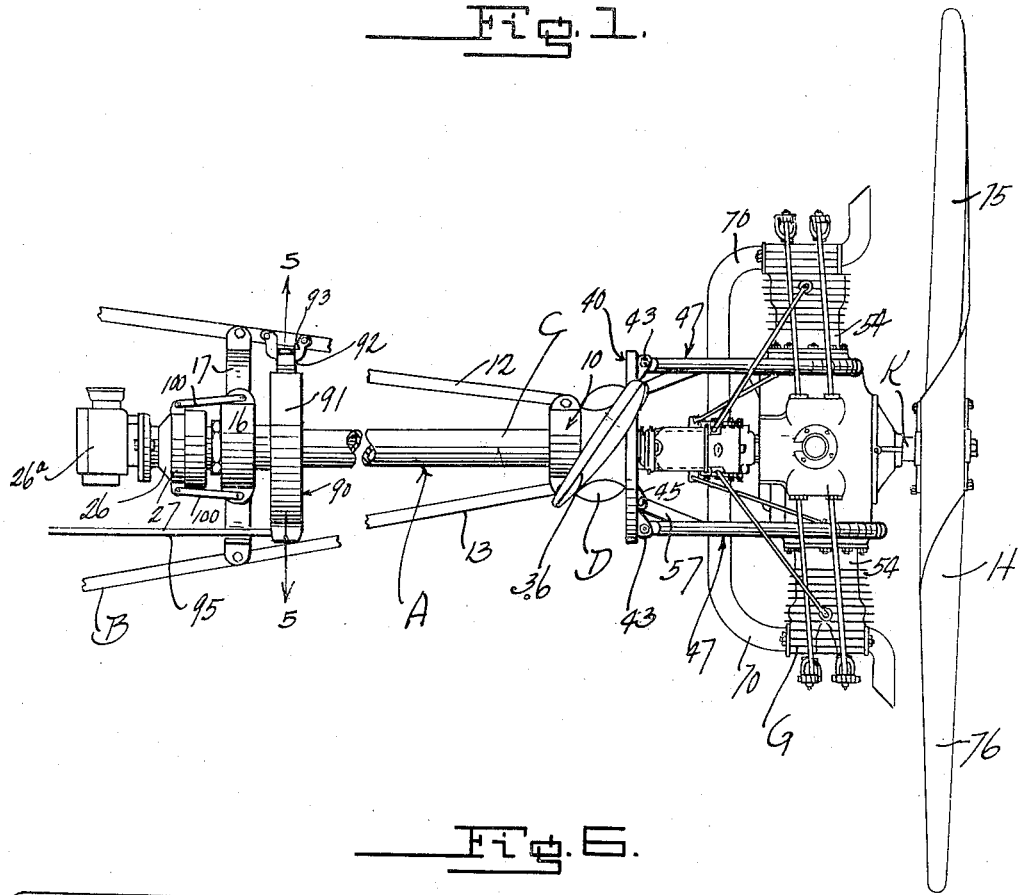
Figure 6:
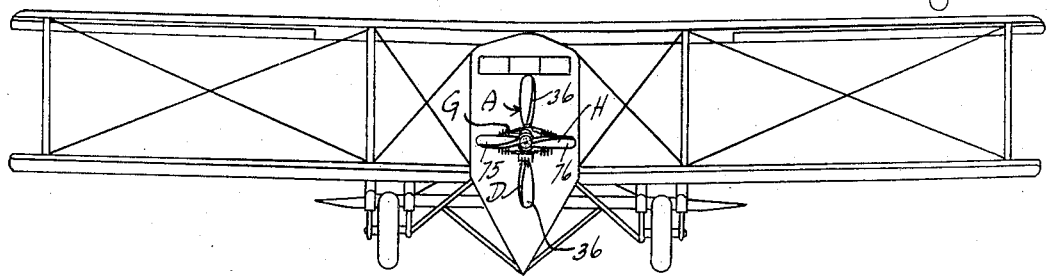
Figure 6 is a front elevation of an airplane, showing the preferred location of the power plant to best carry out the objects of this invention.
Figure 7:
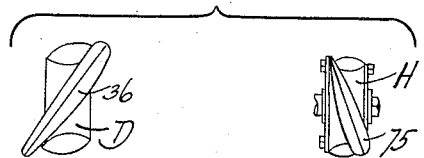
Figure 7 are end views, partially diagrammatic, showing the relative pitch inclination of the main and auxiliary propellers.

In the drawings, wherein for the purpose of illustration is shown only a preferred embodiment of the invention, the letter A may generally designate the improved device, which includes a frame B stationary with or a part of the aircraft fuselage, having a shaft C rotatably bearing therein. The shaft C is connected with an auxiliary propeller construction D, for rotary movement therewith, having detachably connected therewith a frame F which supports a motor G in such relation that the motor G may rotate with the propeller D and the shaft C. The engine or motor G has a main propeller H connected to the crank shaft K thereof.

The motor G is of the Wright-Morehouse air cooled type, the construction of which need not be specifically enlarged upon, but which includes the crank shaft K having a propeller H operatively connected directly thereto at the front of the motor, and of course, at the front of the aircraft in advance of the motor.

The hollow shaft or tube C is sufficiently strong to support the portion of the unit attached therewith, and at its forward end it is provided with an anti-friction bearing 10 mounted in a stationary casing 11 by means of the rearwardly extending divergent beams or struts 12 and 13, which are suitably connected to the fuselage (not shown) or are a part thereof. The anti-friction bearing 10 is preferably of the roller type, and the shaft or tube C extends directly therethrough. A second anti-friction bearing 16, preferably of the ball type, is rearwardly supported by bracket means 17 upon the beams 12 and 13, which insures a fore and aft support of the hollow shaft or tube C. The distance between these two bearings should be more than one-half of the diameter of the revolving parts of the motor. These distances can be arranged to suit the main frame of the aircraft on which the unit is installed.

The tube or hollow shaft C at its forward end is flanged at 25 for connection with the intake manifold extensions 70, so that the gas mixture may be fed to the cylinders. The carburetor 26ª is connected at the rear end of the tube or shaft C by means 26 which may be stationary with the aircraft frame, and suitably connected by a packing gland 27 with the hollow shaft C; said shaft C having a detachable nut 28 to retain the gland against end movement of the tube C, as shown in Figure 3. The passageway of the tube C, designated at 30, in addition to receiving fuel, may receive an oil tube, or the tachometer drive, as well as other control and operating elements leading to the parts of the motor. They may be freely spaced from the walls of the tube, or mounted in any approved relation therethrough.

A mounting plate 30 is provided, detachably connected with the auxiliary propeller construction D by transverse connecting bolts 37. The propeller construction D may include a hub portion 35, which may be integral or otherwise rigid with the plate 40, and which may be keyed to the shaft C in any approved manner, if desired. The propeller blades 36, through which the bolts 37 extend, are radial to the hub 35 and diametrical in line. The said plate 40 is of metal, capable of withstanding shocks placed thereon, and on the forward face at each side of the axis of the tubular shaft C extending therethrough, the same is provided with upper and lower attaching lugs 43 and 44, and an intermediate attaching lug 45 at each side of the axis of said tube C. These lugs are all apertured. Substantially U-shaped brackets 47 are provided, as constituting part of the means F, preferably two of the same being provided for the mounting of the specific engine shown. These brackets 47 include the horizontal arm portions 49 detachably connected at 50 at their free ends to the apertured lugs 44 of the plate 40. The arms 49 at their free ends are connected by right angled bight portions 50 with arms 51 which detachably connect at 52 with the other lugs 43. These U-shaped brackets 47 extend about the bases of the cylinders 54 of the motor G, and clamp the motor in position. Diagonal braces 57 are connected with the lugs 45, as shown in Figure 1, and extend for connection to the right angled arms 49 of the brackets 47, in approved manner. They may be welded to the arms 49 at this location, if desired. Suitable braces or extensions may otherwise connect the motor to the plate 40, and of course the tube C at its detachable front section 65, shown in Figure 3, connects at the fore end 25 thereof with the motor intake 70, at opposite sides, as can readily be understood.

The propeller H connected with the crank shaft K is provided with blades 75 and 76, the pitch of which may be varied in accordance with the type of engine and aircraft to which it is to be attached. The auxiliary propeller D of course rotates with the motor, and the pitch of the blades 36 thereof is opposed to the pitch of the blades 75 and 76 of the main propeller. Moreover, the pitch inclination of the blades 36 is appreciably greater than the pitch inclination of the blades 75 or 76, in the preferred construction, so that the speed rotation of the auxiliary propeller D need not be as great as the speed of the main propeller H to balance the motor torque.

The operation of the engine D will of course drive the propeller H. The back pressure in the housing, due to operation, will cause the engine housing to rotate counter to main propeller rotation, and of course the auxiliary propeller D being connected thru the plate 40 with the motor housing, will be caused to rotate opposite the rotation of the main propeller H. This mode of operation will compensate the motor torque in driving the main propeller, and the aircraft will be enabled to ride upon an even keel, without the usual turning action about its longitudinal axis. The power plant may be electric, steam, internal combustion engine or any other power type.

Assuming that the crank shaft of the motor is being revolved at 2000 revolutions per minute, as a result of fuel operaton in the motor upon the crank shaft. Under such circumstances the auxiliary propeller D will be rotated opposite to the direction of rotation of the main propeller, say at approximately 1000 revolutions per minute. This of course depends upon the ratio of the pitch inclination of the blades of the main and auxiliary propellers. With the main propeller rotating clockwise under fuel operation of 2000 revolutions per minute, and the motor unit rotating counter clockwise, it can readily be seen that the propelling efficiency of the power plant will be the equivalent of a motor with a propeller rotation of 3000 revolutions per minute. The speed ratio between the two propellers is determined by making the pitch and length of the auxiliary propeller blade such that the resistance offered is sufficient to make the speed of said propeller approximately one-half of that of the main propeller. However, the pitch and length of both propellers may vary according to conditions. Under some conditions it may be practical to revolve the motor and auxiliary propeller at the same speed of rotation or at a greater speed than the rotation of the main propeller.

The operation of the apparatus should be flexible, so that the counter revolution of the motor may be instantly cut out, and the aircraft driven solely by normal main propeller revolution not augmented by counter motor revolution. To this end, a brake drum or wheel 90 is keyed upon the tubular shaft C adjacent to the bearing 16, for rotation with the shaft C. A brake band 91 cooperates thereabout, being supported at one side at 92 upon a bracket 93 connected with the fuselage frame beam 12, and at its opposite ends operated by an expanding and contracting lug 94 of usual construction, which may be operated by a member 95 extending rearwardly to the cock pit.

From the foregoing description it is readily apparent that by rotatably mounting the motor housing on the aircraft, back pressure due to motor operation will eliminate the torque effect of the motor tending to rotate the aircraft about its axis, and due to the auxiliary propeller connection with the motor housing, the said auxiliary propeller will operate in driving the aircraft forward without loss of power. For this reason a very high speed motor is rendered feasible for use, due to the elimination of torque. The use of the mechanism for preventing rotation of the motor housing during operation enables the variation in driving efficiency of the main propeller. Especially during starting, the braking mechanism is an important feature, so that motion imparted to the propeller for cranking the engine will not turn the motor housing.

If desired the rear propeller may be made much larger than the front propeller.

As shown in Figure 1 of the drawings the gland nut 27 is held stationary by braces 100 connected with the stationary casing of the outer race of the bearing 16.

Suitable bolts may connect in the frame openings 60 to mount the cylinder of the motor in place, if desired.

Various changes in the shape, size, and arrangement of parts may be made to the form of invention herein shown and described, without departing from the spirit of the invention or the scope of the claims.

I claim:

1. In a motor mounting for aircraft the combination of a stationary frame attachable to the aircraft, a motor including a housing, a crank shaft, and main propeller thereon, a motor mounting rotatably carried by said frame and having the motor housing rigidly connected therewith, an auxiliary propeller connected with the motor mounting for rotation therewith, said main and auxiliary propellers being driven in opposite directions, the main propeller being driven incident to normal crank shaft operation and the auxiliary propeller being driven incident to drive of the motor mounting thru back pressure from the motor operation, said propellers having the blades thereof oppositely inclined so that they will produce a propelling effect upon the aircraft in the same direction, the inclination of the auxiliary propeller being greater than the pitch inclination of the oppositely inclined main propeller, and the auxiliary propeller being of appreciably greater effective length than the main propeller.

2. In aircraft propelling means the combination of a non-rotatable frame, a motor, means supporting the motor for bodily rotation upon said frame, a crank shaft for the motor, a main propeller connected with the crank shaft, an auxiliary propeller connected with the motor supporting means and rotatable with the motor independent of crank shaft rotation, the pitch inclinations of said propellers being relatively opposed with the effective length and pitch inclination of the auxiliary propeller being greater than those of the main propeller and in ratios so that the back pressure due to motor operation will counter rotate the auxiliary propeller and motor housing connected therewith at one-half the speed of revolution of the main propeller.

3. In aircraft propelling means a non-rotatable aircraft attaching frame, a shaft rotatable in said frame, an auxiliary propeller keyed to the shaft and rotatable therewith, a motor including a casing connected to said shaft for rotation therewith, a crank shaft for the motor, a main propeller connected with the crank shaft and rotatable independently of the auxiliary propeller, the pitch inclination of the blades of the two propellers being opposed, a brake drum keyed to the first mentioned shaft for rotation therewith, brake band expanding and contracting means associated with said frame for said drum whereby to prevent or permit rotation of said first mentioned shaft, said first mentioned shaft being hollow and having means connected therewith for attachment of a carburetor thereto for sending the fuel therethrough, and means connecting said hollow shaft with the intake manifold of the engine.

4. In aircraft propelling means a non-rotatable frame, a hollow shaft, spaced bearings supporting the hollow shaft upon said frame, means at one end of the shaft for connecting a stationary carburetor therewith for sending fuel into the hollow shaft, an auxiliary propeller keyed with said shaft for rotation therewith, means for preventing or permitting rotation of said shaft, a motor including a casing, means rigidly connecting the casing of the motor with said shaft, a crank shaft for the motor, and a main propeller connected with the crank shaft and independently rotatable with respect to the auxiliary propeller, the blades of the two propellers being opposed.

CHARLEY L. BROWN.